United States Patent
Ugawa et al.

(10) Patent No.: US 7,767,350 B2
(45) Date of Patent: Aug. 3, 2010

(54) NONAQUEOUS ELECTROLYTE BATTERY

(75) Inventors: Shinsaku Ugawa, Fukushima (JP); Tokio Kuwada, Fukushima (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 10/350,224

(22) Filed: Jan. 24, 2003

(65) Prior Publication Data

US 2003/0170550 A1  Sep. 11, 2003

(30) Foreign Application Priority Data

Jan. 31, 2002  (JP) .......................... P2002-024243

(51) Int. Cl.
*H01M 6/16* (2006.01)
(52) U.S. Cl. .................. 429/330; 429/331; 429/332; 429/231.1; 429/233; 429/231.4; 429/231.8; 429/338; 429/163; 429/176
(58) Field of Classification Search ................ 429/331, 429/332, 231.1, 233, 231.4, 231.8, 338, 163, 429/176, 330
See application file for complete search history.

(56) References Cited

U.S. PATENT DOCUMENTS 5,437,944 A * 8/1995 Kita et al. .................... 429/333
6,511,776 B1 * 1/2003 Ohshita et al. ............... 429/338
6,794,089 B2 * 9/2004 Sekino et al. ................ 429/331
2006/0093914 A1 * 5/2006 Tanaka et al. ............ 429/231.1

FOREIGN PATENT DOCUMENTS

| JP | 2001-143764 | 5/2001 |
| JP | 2001-223025 | 8/2001 |
| JP | 2002-298914 | * 10/2002 |

OTHER PUBLICATIONS

Japanese Office Action issued Jan. 13, 2009 for corresponding Japanese Application No. 2007-28016.

* cited by examiner

*Primary Examiner*—Laura S Weiner
(74) *Attorney, Agent, or Firm*—Rader, Fishman & Grauer PLLC

(57) ABSTRACT

A nonaqueous electrolyte battery includes: a cathode using a composite compound of lithium and transition metals as a positive active material; an anode using a negative active material capable of being doped with and doped from lithium; and a nonaqueous electrolyte interposed between the cathode and the anode. The nonaqueous electrolyte is obtained by dissolving $LiMF_m$ (M is an element selected from As, B, P and Sb, and m is an integer located within a range of 4 to 6.) and $LiC_nF_{2n+1}SO_3$ or $LiN(C_nF_{2n+1}SO_2)_2$ in a nonaqueous solvent including cyclic carbonate or non cyclic carbonate and having unsaturated carbonate added within a range of 0.1 volume % or more and 5 volume % or less, and the concentration of $LiC_nF_{2n+1}SO_3$ or $LiN(C_nF_{2n+1}SO_2)_2$ is located within a range of 1 wt % or more and lower than 10 wt %. Thus, a self-discharge is suppressed and a storage property is improved.

9 Claims, 2 Drawing Sheets

NONAQUEOUS ELECTROLYTE BATTERY

BACKGROUND OF THE INVENTION

1. Field of the Invention

The present invention relates to a nonaqueous electrolyte battery and, more particularly, to a nonaqueous electrolyte battery in which a self-discharge is suppressed and a storage property is improved.

This application claims priority of Japanese Patent Application No. 2002-024243, filed on Jan. 31, 2002, the entirety of which is incorporated by reference herein.

2. Description of the Related Art

With the progress of recent electronic technology, electronic devices such as a video camera with video tape recorders, portable telephones, lap top computers, etc. have been developed. Then, as portable power sources employed for these electronic devices, the development of compact and light secondary batteries having high energy density has been eagerly demanded.

As secondary batteries which satisfy such a demand, nonaqueous electrolyte secondary batteries using light metals, such as lithium (Li), sodium (Na), aluminum (Al), and the like, as negative active materials have been getting attention. These nonaqueous electrolyte secondary batteries, theoretically, can generate a higher voltage and have a higher energy density than those of aqueous, electrolyte secondary batteries. Nonaqueous electrolyte secondary batteries that are charged with and discharge lithium ions ($Li^+$) through nonaqueous electrolyte solution have been progressively and vigorously studied and developed as batteries which can realize a high output and a high energy density.

The above-described lithium secondary battery comprises an anode composed of, for instance, lithium, lithium alloy or a compound of lithium and a carbonaceous material and capable of reversibly doping with and dedoping from lithium ions, a cathode and a nonaqueous electrolyte interposed between the cathode and the anode.

However, the battery using the nonaqueous electrolyte solution obtained by dissolving an electrolyte salt in a nonaqueous solvent as the nonaqueous electrolyte is inconveniently large in its self-discharge and inferior in its storage characteristics.

SUMMARY OF THE INVENTION

The present invention was proposed by considering the above-described circumstances, and it is an object of the present invention to provide a nonaqueous electrolyte battery in which a self-discharge is suppressed and a storage property is improved.

For achieving the above-described object, a nonaqueous electrolyte battery according to the present invention comprises a cathode using a composite compound of lithium and transition metals as a positive active material; an anode using a negative active material capable of being doped with and dedoped from lithium; and nonaqueous electrolyte interposed between the cathode and the anode; wherein the nonaqueous electrolyte is obtained by dissolving $LiMF_m$ (M is an element selected from As, B, P and Sb, and m is an integer located within a range of 4 to 6.) and $LiC_nF_{2n+1}SO_3$ or $LiN(C_nF_{2n+1}SO_2)_2$ in a nonaqueous solvent including cyclic carbonate or non cyclic carbonate and having unsaturated carbonate added within a range of 0.1 volume % or more and 5 volume % or less and the concentration of $LiC_nF_{2n+1}SO_3$ or $LiN(C_nF_{2n+1}SO_2)_2$ is located within a range of 1 wt % or more and lower than 10 wt %.

In the nonaqueous electrolyte battery according to the present invention as mentioned above, since the nonaqueous electrolyte is obtained by dissolving $LiMF_n$, (M is an element selected from As, B, P and Sb, and m is an integer located within a range of 4 to 6.) and $LiC_nF_{2n+1}SO_3$ or $LiN(C_nF_{2n+1}SO_2)_2$ in a nonaqueous solvent including cyclic carbonate or non cyclic carbonate and having unsaturated carbonate added within a range of 0.1 volume % or more and 5 volume % or less and the concentration of $LiC_nF_{2n+1}SO_3$ or $LiN(C_nF_{2n+1}SO_2)_2$ is located within a range of 1 wt % or more and lower than 10 wt %, a coated layer on which the dissociation of $LiMF_m$ is hardly generated is formed and a self-discharge can be suppressed.

BRIEF DESCRIPTION OF THE DRAWINGS

The object and other objects and advantages of the present invention will be apparent more clearly from the following specification in conjunction with the accompanying drawings in which.

DETAILED DESCRIPTION OF THE PREFERRED EMBODIMENT

Figure 1:
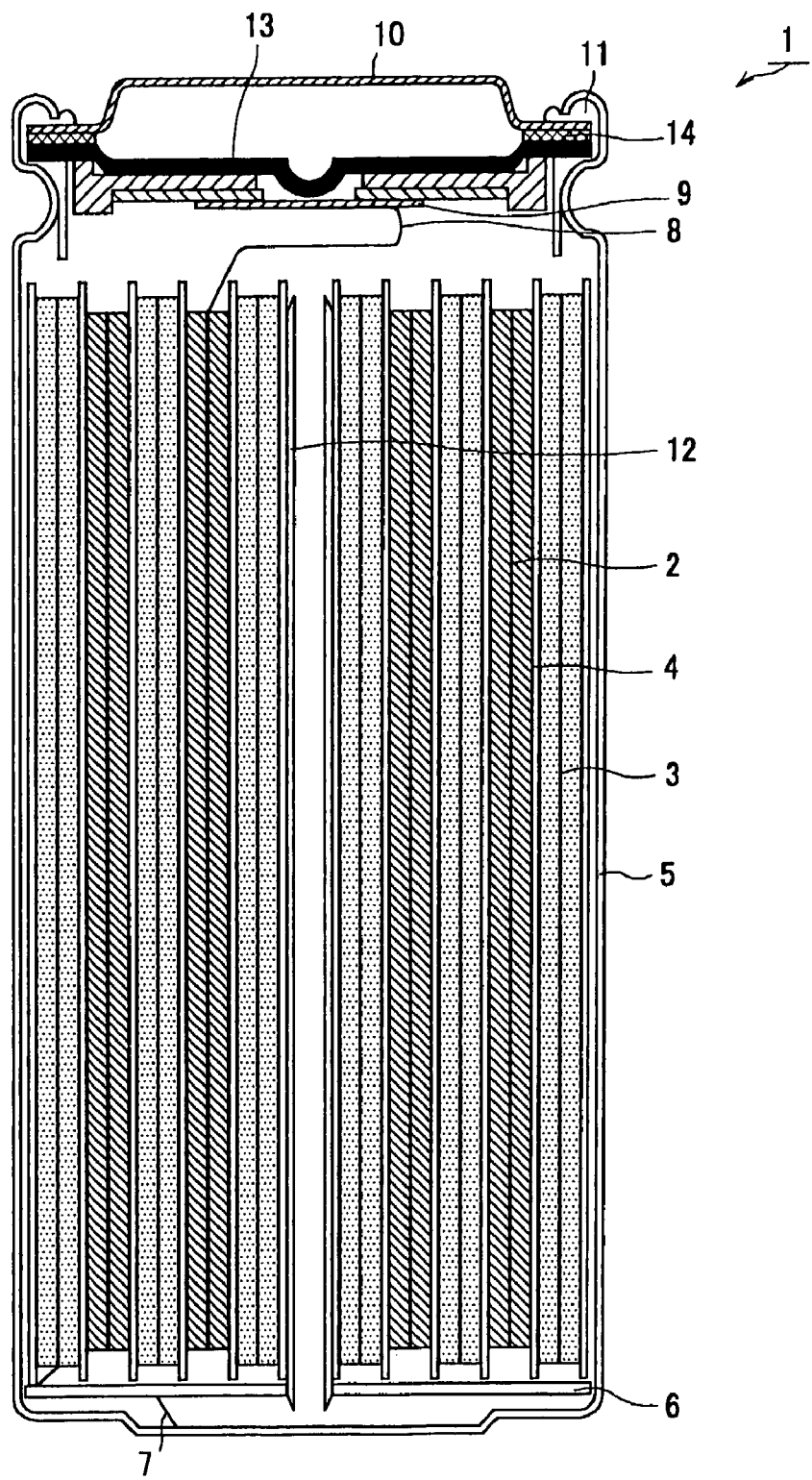
FIG. 1 is a longitudinal sectional view showing one structural example of a nonaqueous electrolyte battery according to the present invention.

FIG. 1 is a longitudinal sectional view showing one structural example of a nonaqueous electrolyte battery according to the present invention. As shown in FIG. 1, a nonaqueous electrolyte battery 1 comprises a film-type cathode 2, a film-type anode 3 and a separator 4. The film-type cathode 2 and the film-type anode 3 are coiled spirally through the separator 4 in a tightly-contacted state to form a spirally-coiled body. The above-mentioned spirally-coiled body is inserted in a battery can.

The above-described cathode 2 is manufactured by applying a cathode composite mixture including a positive active material and a binding agent on a current collector and drying the cathode composite mixture. As the current collector, a metallic foil such as an aluminum foil is employed.

As the positive active material, metallic oxides, metallic sulfides or specific polymers can be used depending on the kinds of objective batteries.

For example, when a lithium primary battery is formed, $TiS_2$, $MnO_2$, graphite, $FeS_2$, and the like, can be employed as the positive active material. Further, when a lithium secondary battery is formed, metallic sulfides or metallic oxides, and the like, such as $TiS_2$, $MoS_2$, $NbSe_2$, $V_2O_5$, etc., may be used as the positive active material. Further, there may be preferably used a lithium composite oxide including as a main component lithium transition metal oxide expressed by $Li_xM_yO_2$ (M indicates an element including one or more kinds of transition metals, x is larger than 0 and not larger than 1.10, and y is larger than 0.5 and smaller than 2.). As transition metals M forming the lithium composite oxide, Co, Ni, Mn or the like are preferably employed. As the specific examples of the lithium composite oxides, there may be exemplified $LiCoO_2$, $LiNiO_2$, $LiNi_yCO_{1-y}O_2$ (in the formula, y is larger than 0 and smaller than 1.), $LiMn_2O_4$, and the like. These lithium composite oxides form the positive active materials which can generate high voltage and are excellent in view of energy density. For the cathode 2, a plurality of various kinds of positive active materials may be combined together and used.

As the binding agent of the cathode composite mixture, not only a well-known binding agent ordinarily used for the cathode composite mixture of a battery can be employed, but also a well-known addition agent, such as a conductive agent, may be added to the cathode composite mixture.

The anode 3 is manufactured by applying an anode composite mixture including a negative active material and a binding agent on a current collector and drying the anode composite mixture. As the current collector, a metallic foil such as a copper foil is used.

When the lithium primary battery or the lithium secondary battery is formed, as a negative material, preferably, there may be used lithium, lithium alloys or materials capable of being doped with or dedoped from lithium. As the materials capable of being doped with or dedoped from lithium, for instance, carbon materials such as non-graphitizable carbon materials or graphite materials may be employed. Specifically, there may be used carbon materials such as pyrocarbons, coke, graphites, vitreous carbon fibers, organic polymer compound sintered bodies, carbon fibers, activated carbons, etc. The coke materials include pitch coke, needle coke, petroleum coke, etc. The organic polymer compound sintered bodies are those obtained by sintering and carbonizing phenolic resins, furan resins, etc. at suitable temperature.

As the materials capable of being doped with and dedoped from lithium, there may be also employed polymers, such as polyacetylene, polypyrrole, and the like, or oxides, such as $SnO_2$. Further, as lithium alloys, lithium-aluminum alloy or the like can be used.

Further, as the binding agent of the anode composite mixture, not only a well-known binding agent ordinarily employed for the anode composite mixture of a lithium-ion battery can be used, but also a well-known addition agent or the like can be added to the anode composite mixture.

Nonaqueous electrolyte solution is prepared by dissolving electrolyte materials in a nonaqueous solvent.

In the nonaqueous electrolyte battery 1 according to the present invention, the nonaqueous electrolyte solution is obtained by dissolving as electrolyte materials $LiMF_m$ (M is an element selected from As, B, P and Sb, and m is an integer located within a range of 4 to 6.) and $LiC_nF_{2n+1}SO_3$ or $LiN(C_nF_{2+1}SO_2)_2$ in a nonaqueous solvent including cyclic carbonate or non-cyclic carbonate and adding unsaturated carbonate. The above-described nonaqueous electrolyte solution is employed, and, accordingly, the nonaqueous electrolyte battery 1 has a self-discharge suppressed and is excellent in its storage characteristics.

When the unsaturated carbonate is included in the nonaqueous electrolyte solution, vinylene carbonate reacts with the surface of the anode in the earliest stage to form a coated layer by an initial charging operation and an LiF coated layer is formed thereon. This LiF-coated layer may disadvantageously cause the self-discharge of the battery to deteriorate the storage characteristics.

However, when $LiC_nF_{2n+1}SO_3$ or $LiN(C_nF_3SO_2)_2$ exists in the nonaqueous electrolyte solution, the LiF-coated layer is hardly formed due to the coexistent effect of vinylene carbonate and $LiN(C_nF_3SO_2)_2$. Then, instead thereof, a coated layer in which the dissociation of $LiMF_m$ is hardly generated may be formed to reduce the self-discharge.

As the cyclic carbonate, there may be exemplified, for example, ethylene carbonate, propylene carbonate, etc. As the non-cyclic carbonate, there may be exemplified, for instance, dimethyl carbonate, diethyl carbonate, ethyl methyl carbonate, etc. These nonaqueous solvents maybe used independently, or a plurality of kinds of them may be mixed and the mixture may be used.

As the unsaturated carbonates added to the nonaqueous solvent, there may be exemplified, for example, vinylene carbonate, carbonate compounds having vinyl groups in side chains, compounds having chain vinyl groups, etc. Then, the amount of addition of the unsaturated carbonate is preferably located within a range of 0.1 volume % or more and 5 volume % or less relative to the mixed solvent. When the amount of addition of the unsaturated carbonate is less than 0.1 volume %, an effect that the self-discharge is suppressed and the storage property is improved cannot be adequately obtained. Further, when the amount of addition of the unsaturated carbonate is more than 5 volume %, the storage property is rather deteriorated.

Further, as $LiMF_m$, there may be specifically exemplified $LiAsF_6$, $LiPF_6$, $LiBF_4$, $LiSbF_6$, etc. As $LiC_nF_{2n+1}SO_3$, there may be specifically enumerated $LiCF_3SO_3$, $LiC_2F_5SO_3$, etc. As $LiN(C_nF_{2n+1}SO_2)_2$, there may be exemplified $LiN(CF_3SO_2)_2$, $LiN(C_2F_5SO_2)_2$, etc. Then, the concentration of $LiC_nF_{2n+1}SO_3$ or $LiN(C_nF_{2n+1}SO_2)_2$ is preferably located within a range of 1 wt % or more and lower than 10 wt %. When the concentration of $LiC_nF_{2n+1}SO_3$ or $LiN(C_nF_{2n+1}SO_2)_2$ is less than 1 wt %, the effect in which the self-discharge is suppressed and the storage property is improved cannot be adequately obtained. When the concentration of $LiC_nF_{2n+1}SO_3$ or $LiN(C_nF_{2n+1}SO_2)_2$ is 10 wt % or more, an initial charging amount is deteriorated inconveniently.

The cathode 2 and the anode 3, as mentioned above, are spirally coiled many times through the separator 4 in a tightly contacted state to form a spirally coiled body. An insulating plate 6 is arranged on the bottom part of the battery can 5 made of iron, the inside of which is plated with nickel and the spirally coiled body is accommodated on the insulating plate 6.

In order to collect a current of the anode, one end of an anode lead 7 made of, for instance, nickel is attached under pressure to the anode 3 and the other end is welded to the battery can 5. Thus, the battery can 5 is electrically connected to the anode 3 and serves as an external anode of the nonaqueous electrolyte battery 1.

In order to collect a current of the cathode 2, one end of a cathode lead 8 made of, for instance, aluminum is attached to the cathode 2 and the other end is electrically connected to a battery cover 10 through a current cutting-off thin plate 9. This current cutting-off thin plate 9 cuts off the current in accordance with the internal pressure of the battery. Thus, the battery cover 10 is electrically connected to the cathode 2 and serves as an external cathode of the nonaqueous electrolyte battery 1.

Then, nonaqueous electrolyte solution is injected into the battery can 5 so that the spirally coiled body is impregnated with the nonaqueous electrolyte solution. The battery can 5 is caulked through an insulating sealing gasket 11 to which asphalt is applied, so that the battery cover 10 is fixed to the battery can 5.

In the nonaqueous electrolyte battery 1, as shown in FIG. 1, a center pin 12 is provided in nearly the center of the spirally coiled body. Further, there are provided a safety valve device 13 connected to the cathode lead for purging gas in the battery when the pressure in the battery is higher than a prescribed value and a PTC element 14 for preventing the rise of temperature in the battery, and the anode electrode is provided with an anode lead that is connected to the battery can.

In the nonaqueous electrolyte battery 1 of the present invention having the above-described structure, since the nonaqueous electrolyte solution is obtained by dissolving $LiMF_B$, (M is an element selected from As, B, P and Sb, and m is an integer located within a range of 4 to 6.) and $LiC_n$ $F_{2n+1}SO_3$ or $LiN(C_nF_{2n+1}SO_2)_2$ in a nonaqueous solvent including cyclic carbonate or non cyclic carbonate and having unsaturated carbonate added within a range of 0.1 volume % or more and 5 volume % or less and the concentration of $LiC_nF_{2n+1}SO_3$ or $LiN(C_nF_{2n+1}SO_2)_2$ is located within a range of 1 wt % or more and lower than 10 wt %, a self-discharge can be suppressed and cyclic characteristics are excellent.

In the above-described embodiment, although the nonaqueous electrolyte battery using the nonaqueous electrolyte solution is described as an example, it is to be understood that the present invention is not limited thereto, and the present invention may be applied to a solid electrolyte battery using a solid electrolyte including the simple substance or the mixture of conductive polymer compounds or a gel electrolyte battery using a gel electrolyte in which the nonaqueous electrolyte solution is gelled by a matrix polymer.

As the conductive polymer compounds included in the solid polymer electrolyte, there may be specifically exemplified silicon, acryl, acrylonitrile, modified polyphosphazene polymer, polyethylene oxide, polypropylene oxide, fluoropolymer or composite polymers, cross-linked polymers, modified polymers of these compounds, etc. As the fluoropolymers, there may be enumerated poly(vinylidene fluoride), poly(vinylidene fluoride-co-hexafluoropropylene), poly(vinylidene fluoride-co-tetrafluoroethylene), poly(vinylidene fluoride-co-trifluoroethylene), etc.

Especially, as the matrix polymers of the gel electrolyte, fluoropolymers may be preferably used from the viewpoint of oxidation-reduction stability. Particularly, fluoropolymer materials may be desirably employed in view of oxidation-reduction stability. The molecular weight of the polymer suitably ranges from about 300000 to 800000. The polymer can be ordinarily dispersed in the electrolyte, generally in such a manner that the polymer, such as polyvinylidene fluoride, is dissolved in nonaqueous electrolyte solution obtained by dissolving the electrolyte in the nonaqueous solvent to have a sol. In such a way, an ionic conductivity is applied to the matrix polymer of the gel electrolyte by containing electrolyte salts in the nonaqueous electrolyte solution.

When, in the matrix polymer, a polymer simple substance or the gel electrolyte using it shows an ionic conductivity of 1 mS/cm or higher at room temperature, the chemical structure of the matrix polymer may not limited to a specific structure. As the matrix polymers, there may be exemplified polyvinylidene fluoride, polyacrylonitrile, polyethylene oxide, polysiloxane compounds, polyphosphazene compounds, polypropylene oxide, polymethyl methacrylate, polymethacrylonitrile, polyether compounds, etc.

Further, as the solid electrolyte, when an inorganic solid electrolyte and a solid polymer electrolyte are composed of a material having a lithium ion conductivity, both the electrolytes can be employed. As the inorganic solid electrolytes, there may be used crystalline solid electrolytes, such as lithium nitride and lithium iodide, amorphous solid electrolytes, such as lithium ion conductive glass including $LiI—Li_2S—P_2S_6$ glass and $LiI—Li_2S—B_2S_6$ glass, and the like.

Further, the solid polymer electrolyte comprises electrolyte salt and polymer compound for dissolving the electrolyte salt. As the polymer compounds, ether polymers, such as polyethylene oxide or cross-linked materials thereof, polymethacrylate ester, acrylate, and the like, may be independently used or copolymerized in molecules or mixed together for use.

In the above-described embodiment, although the secondary battery is described as an example, it is to be understood that the present invention is not limited thereto and the present invention may be applied to a primary battery. Further, in the battery of the present invention, the form is not especially limited to a specific form, so that the battery may be applied to any form, such as a cylindrical type, a prismatic type, a coin type, a button type, etc. The size of the battery is not limited to a specific size, so that the battery may have any size, including a thin type, a large size, and the like.

EXAMPLES

Now, examples and comparative examples that are carried out to recognize the effects of the present invention will be described below. In the following examples and comparative examples, although specific compound names and numeric values are employed and described, it is to be understood that the present invention is not limited thereto.

Example 1

Initially, an elongated anode was manufactured as described below. Graphite of 90 parts by weight as a negative active material was mixed with polyvinylidene fluoride of 10 parts by weight as a binding agent to prepare an anode composite mixture. The anode composite mixture was dispersed in N-methyl-2-pyrrolidone to obtain a slurry.

As an anode current collector, an elongated copper foil having a thickness of 10 μm was employed. The anode composite mixture slurry was applied to both the surfaces of this current collector and dried, and then the obtained product was compression-molded under a prescribed pressure. Then, the formed product was cut to a member having a width of 56 mm to form the elongated anode.

On the other hand, an elongated cathode was manufactured as mentioned below. Initially, a positive active material was prepared as described below. In order to obtain the positive active material ($LiCoO_2$), lithium carbonate was mixed with cobalt carbonate in the ratio of 0.5 mole:1 mole, and the mixture was sintered in air at 900° C. for 5 hours. Then, the obtained $LiCoO_2$ of 91 parts by weight, graphite of 6 parts by weight as a conductive agent and polyvinylidene fluoride (PVdF) of 3 parts by weight as a binding agent were mixed together to prepare a cathode composite mixture. The cathode composite mixture was dispersed in N-methyl-2-pyrrolidone to have slurry.

As a cathode current collector, an elongated aluminum foil having a thickness of 20 μm was employed. The cathode composite mixture slurry was uniformly applied to both surfaces of the current collector and dried. Then, the obtained product was compression-molded. Then, the formed product was cut to a member having the width of 54 mm to form the elongated cathode.

Subsequently, the elongated anode and the elongated cathode manufactured as described above were laminated through a separator made of a microporous polyethylene film with a thickness of 25 m, and then the anode, the separator, the cathode and the separator were stacked respectively to obtain a laminated body. Then, the obtained laminated body'was coiled many times and fixed by an adhesive tape to form a spirally coiled electrode body.

The spirally coiled electrode body manufactured as described above was accommodated in a battery can plated with nickel. Then, insulating plates are disposed on both the upper and lower surfaces of the spirally coiled electrode body. An cathode lead made of aluminum was drawn from the cathode current collector and welded to a safety valve device. An anode lead made of nickel was drawn from the anode current collector and welded to the battery can.

Nonaqueous electrolyte solution was injected into the battery can 5. The nonaqueous electrolyte solution was prepared by dissolving $LiPF_6$ of 20 wt %, $LiN(CF_3SO_2)_2$ of 3 wt % and vinylene carbonate with the concentration of 1 volume % in a mixed solvent obtained by mixing together propylene carbonate, ethylene carbonate and dimethyl carbonate in a volume ratio of 1:4:4.

After that, the battery can was caulked through an insulating sealing gasket having asphalt applied to its surface so that a safety valve device having a current cutting-off mechanism and a battery cover were fixed to the battery can to maintain air-tightness in the battery. Thus, a cylindrical-type nonaqueous electrolyte secondary battery having a diameter of 18 mm and a height of 65 mm was manufactured.

Comparative Example 1

A cylindrical-type nonaqueous electrolyte secondary battery was manufactured in the same manner as that of the Example 1, except that vinylene carbonate was not added to the nonaqueous electrolyte solution.

Comparative Example 2

A cylindrical-type nonaqueous electrolyte secondary battery was manufactured in the same manner as that of the Example 1, except that $LiN(CF_3SO_2)_2$ was not added to the nonaqueous electrolyte solution.

Comparative Example 3

A cylindrical-type nonaqueous electrolyte secondary battery was manufactured in the same manner as that of the Example 1, except that vinylene carbonate and $LiN(CF_3SO_2)_2$ were not added to the nonaqueous electrolyte solution.

Then, a charging and discharging test was carried out for the batteries of the example and the comparative examples to evaluate storage characteristics.

The storage characteristics were evaluated in such a manner as described below. Firstly, a constant-current and constant-voltage charging operation of 1 A was carried out for each battery for 3 hours up to the upper-limited voltage of 4.2 V under the condition of room temperature. Then, a constant-current discharging operation of 1 A was carried out for each battery up to the upper limited voltage of 3.0 V. The above-described operations were taken as one cycle and repeated five times for each battery. Further, the constant-current and constant-voltage charging operation of 1 A was carried out for 3 hours up to the upper limited voltage of 4.2 V. Then, while the battery was charged, the battery was left for 30 days under the environment of 45° C. After the battery was left, the constant-current discharging operation of 1 A was carried out up to the upper limited voltage of 3.0 V under the condition of room temperature. Then, the constant-current and constant-voltage charging operation of 1 A was carried out for 3 hours up to the upper limited voltage 4.2 V. After that, the discharging capacity was measured. The rate of the capacity after the battery was left relative to the capacity before its storage was considered to be a maintaining/retention ratio (%) and (100–maintaining/retention ratio) was considered to be a self-discharge rate (%).

The evaluated results of the self-discharge rate are shown in Table 1.

TABLE 1

| | $LiPF_6$ (wt %) | $LiN(CF_3SO_2)_2$ (wt %) | Vinylene Carbonate (volume %) | Self-discharge Rate (%) |
|---|---|---|---|---|
| Example 1 | 20 | 3 | 1 | 4.2 |
| Comparative Example 1 | 20 | 3 | — | 5.2 |
| Comparative Example 2 | 20 | — | 1 | 12 |
| Comparative Example 3 | 20 | — | — | 10.2 |

As apparent from the Table 1, in the battery of the Example 1 to which all of $LiPF_6$, $LiN(CF_3SO_2)_2$ and vinylene carbonate are added, the self-discharge is more greatly suppressed than those of the batteries of the Comparative Examples 1 to 3 which lack any of them, and accordingly, the effects of the present invention are realized.

The battery of the Comparative Example 2 to which $LiPF_6$ and vinylene carbonate are added has storage characteristics lower than those of the battery of the Comparative Example 3 to which only $LiPF_6$ is added. Accordingly, it was understood that the coexistence of $LiPF_6$, $LiN(CF_3SO_2)_2$, and vinylene carbonate could contribute to the improvement of storage characteristics.

The improvement of the storage characteristics may possibly originate from the cause described below. That is, when vinylene carbonate is present in the nonaqueous electrolyte solution, vinylene carbonate most rapidly reacts with the surface of the anode to form a coated layer upon the initial charging operation and an LiF coated layer is formed thereon. The LiF-coated layer disadvantageously causes a self-discharge to deteriorate the storage characteristics. However, when $LiN(CF_3SO_2)_2$ is present in the nonaqueous electrolyte solution, the LiF-coated layer is hardly formed due to the coexistent effect of $LiN(CF_3SO_2)_2$ and vinylene carbonate. Then, a coated layer on which the dissociation of $LiPF_6$ is hardly generated is formed instead of the LiF coated layer, which may cause the self-discharge to be decreased.

Examples 2 and 3 and Comparative Examples 4 and 5 described below were evaluated by respectively changing the concentration of vinylene carbonate.

Example 2

A cylindrical-type nonaqueous electrolyte secondary battery was manufactured in the same manner as that of the Example 1, except that the concentration of vinylene carbonate was 3 volume %.

Example 3

A cylindrical-type nonaqueous electrolyte secondary battery was manufactured in the same manner as that of the Example 1, except that the concentration of vinylene carbonate was 5 volume %.

Comparative Example 4

A cylindrical-type nonaqueous electrolyte secondary battery was manufactured in the same manner as that of the Example 1, except that the concentration of vinylene carbonate was 7 volume %.

Comparative Example 5

A cylindrical-type nonaqueous electrolyte secondary battery was manufactured in the same manner as that of the Example 1, except that the concentration of vinylene carbonate was 10 volume %.

Example 4 and Comparative Examples 6, 7 and 8 described below were evaluated by respectively changing the concentration of $LiN(CF_3SO_2)_2$.

Example 4

A cylindrical-type nonaqueous electrolyte secondary battery was manufactured in the same manner as that of the Example 1, except that the concentration of $LiN(CF_3SO_2)_2$ was 5 wt %.

Comparative Example 6

A cylindrical-type nonaqueous electrolyte secondary battery was manufactured in the same manner as that of the Example 1, except that the concentration of $LiN(CF_3SO_2)_2$ was 10 wt %.

Comparative Example 7

A cylindrical-type nonaqueous electrolyte secondary battery was manufactured in the same manner as that of the Example 1, except that the concentration of $LiN(CF_3SO_2)_2$ was 12 wt %.

Comparative Example 8

A cylindrical-type nonaqueous electrolyte secondary battery was manufactured in the same manner as that of the Example 1, except that the concentration of $LiN(CF_3SO_2)_2$ was 15 wt %.

The self-discharge rate of the battery in each of the Examples and the Comparative Examples manufactured as mentioned above was measured by the above-described method to evaluate the storage characteristics. The evaluated results are shown in Table 2. Further, the relation between the concentration of vinylene carbonate and the self-discharge rate is shown in FIG. 2.

TABLE 2

|  | $LiPF_6$ (wt %) | $LiN(CF_3SO_2)_2$ (wt %) | Vinylene Carbonate (volume %) | Self-discharge Rate (%) |
| --- | --- | --- | --- | --- |
| Example 1 | 20 | 3 | 1 | 4.2 |
| Example 2 | 20 | 3 | 3 | 4.4 |
| Example 3 | 20 | 3 | 5 | 4.6 |
| Comparative Example 4 | 20 | 3 | 7 | 12 |
| Comparative Example 5 | 20 | 3 | 10 | 15 |
| Example 4 | 20 | 5 | 1 | 4.3 |
| Comparative Example 6 | 20 | 10 | 1 | — |
| Comparative Example 7 | 20 | 12 | 1 | — |
| Comparative Example 8 | 20 | 15 | 1 | — |

Figure 2:
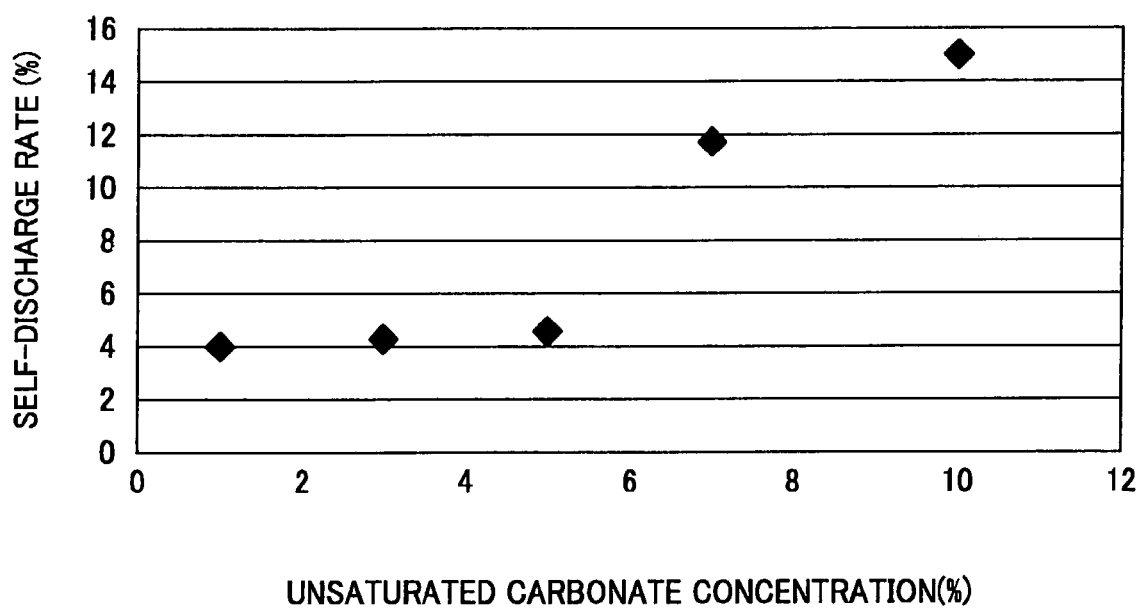
FIG. 2 is a view showing the relation between the concentration of vinylene carbonate and the self-discharge rate.

As apparent from the Table 2 and FIG. 2, the Comparative Examples 4 and 5 in which the amount of vinylene carbonate is more than 5 volume % had a high self-discharge rate so that the storage characteristics were deteriorated. Further, in the Comparative Examples 6, 7 and 8 in which the concentration of $LiN(CF_3SO_2)_2$ was 10 wt % or higher, since the amount of initial discharge was 0, the self-discharge rate could not be measured. This phenomenon may be possibly caused due to the fact that the aluminum of the cathode current collector is eluted.

On the other hand, it is understood that the self-discharge is suppressed to a low value to obtain good storage characteristics in the Examples 1 to 4, in which the amount of vinylene carbonate is 5 volume % or less and the amount of $LiN(CF_3SO_2)_2$ is lower than 10 wt %. When the amount of vinylene carbonate is less than 0.1 volume % or the amount of $LiN(CF_3SO_2)_2$ is less than 1 wt %, the effect that the self-discharge is suppressed to improve the storage characteristics cannot be adequately obtained.

Accordingly, when the concentration of vinylene carbonate is 0.1 volume % or more and 5 volume % or less, and the concentration of $LiN(C_nF_{2n+1}SO_2)_2$ is 1 wt % or higher and lower than 10 wt %, a battery whose self-discharge is suppressed to a low level and whose storage characteristics are excellent can be realized. Especially, it is recognized that the self-discharge is most suppressed and the effects of the present invention are greatly exhibited in the battery of Example 1, in which the amount of vinylene carbonate is 1 volume % and the amount of $LiN(CF_3SO_2)_2$ is 3 wt %.

In the present invention, a nonaqueous electrolyte battery comprises a cathode using a composite compound of lithium and transition metals as a positive active material; an anode using a negative active material capable of being doped with and dedoped from lithium; and nonaqueous electrolyte interposed between the cathode and the anode; and the nonaqueous electrolyte is obtained by dissolving $LiMF_m$ (M is an element selected from As, B, P and Sb, and m is an integer located within a range of 4 to 6.) and $LiC_nF_{2n+1}SO_3$ or $LiN(C_nF_{2n+1}SO_2)_2$ in a nonaqueous solvent including cyclic carbonate or non-cyclic carbonate and having unsaturated carbonate added within a range of 0.1 volume % or more and 5 volume % or less, and the concentration of $LiC_nF_{2n+1}SO_3$ or $LiN(C_nF_{2n+1}SO_2)_2$ is located within a range of 1 wt % or more and lower than 10 wt %. Thus, a coated layer on which the dissociation of $LiMF_m$ is hardly generated is formed due to a synergetic effect and the self-discharge is suppressed. Therefore, according to the present invention, a nonaqueous electrolyte battery excellent in its cyclic characteristics can be realized.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. A nonaqueous electrolyte battery comprising:
    a cathode using a composite compound of lithium and transition metals as a positive active material;
    an anode using a negative active material capable of being doped with and dedoped from lithium;
    a nonaqueous electrolyte interposed between the cathode and the anode; and
    a battery can containing said cathode, said anode and said nonaqueous electrolyte therein,
    wherein said battery can is made of iron and wherein an inside of said battery can is plated with nickel, and
    wherein the nonaqueous electrolyte is obtained by dissolving $LiMF_m$ (where M is an element selected from As, B, P and Sb, and m is an integer located within a range of 4 to 6) and $LiN(CF_3SO_2)_2$ in a nonaqueous solvent consisting of vinylene carbonate and at least one carbonate selected from the group of cyclic carbonates and non-cyclic carbonates, wherein said vinylene carbonate is added within a range of 0.1% by volume to 5% by volume with respect to said nonaqueous solvent; and the concentration of $LiN(CF_3SO_2)_2$ is located within a range of 1% or more by weight to lower than 10% by weight with respect to said nonaqueous electrolyte.

2. The nonaqueous electrolyte battery according to claim 1, wherein the positive active material is a lithium transition metal oxide represented by $Li_xM_yO_2$ (where M is an element including one or more kinds of transition metals, x is larger than 0 and not larger than 1.10, and y is larger than 0.5 and smaller than 2) and the negative active material is a carbonaceous material.

3. The nonaqueous electrolyte battery according to claim 1, wherein the cathode and the anode are formed by forming electrode active material layers on elongated electrode current collectors and the cathode and the anode are laminated through a separator and the laminated body is spirally coiled many times in the longitudinal direction to form an electrode element.

4. The nonaqueous electrolyte battery according to claim 1, wherein concentration of $LiMF_m$ is approximately 20% by weight with respect to said nonaqueous electrolyte.

5. The nonaqueous electrolyte battery according to claim 1, wherein the cyclic carbonate is included as an electrolyte and the cyclic carbonate includes at least ethylene carbonate or propylene carbonate.

6. A nonaqueous electrolyte battery comprising:
   a cathode using a composite compound of lithium and transition metals as a positive active material;
   an anode using a negative active material capable of being doped with and dedoped from lithium;
   a nonaqueous electrolyte interposed between the cathode and the anode; and
   a battery can containing said cathode, said anode and said nonaqueous electrolyte therein,
   wherein said battery can is made of iron and wherein the inside of said battery can is plated with nickel, and
   wherein the nonaqueous electrolyte is obtained by dissolving $LiMF_m$ (where M is an element selected from As, B, P and Sb, and m is an integer located within a range of 4 to 6) and $LiN(CF_3SO_2)_2$ in a nonaqueous solvent consisting of vinylene carbonate and one or more carbonates selected from the group consisting of ethylene carbonate, propylene carbonate, dimethyl carbonate, diethyl carbonate, and ethyl methyl carbonate, wherein said vinylene carbonate is added within a range of 0.1% by volume to 5% by volume with respect to said nonaqueous solvent; and
   the concentration of $LiN(CF_3SO_2)_2$ is located within a range of 1% or more by weight to lower than 10% by weight with respect to said nonaqueous electrolyte.

7. The nonaqueous electrolyte battery according to claim 6, wherein the positive active material is a lithium transition metal oxide represented by $Li_xM_yO_2$ (where M is an element including one or more kinds of transition metals, x is larger than 0 and not larger than 1.10, and y is larger than 0.5 and smaller than 2) and the negative active material is a carbonaceous material.

8. The nonaqueous electrolyte battery according to claim 6, wherein the cathode and the anode are formed by forming electrode active material layers on elongated electrode current collectors and the cathode and the anode are laminated through a separator and the laminated body is spirally coiled many times in the longitudinal direction to form an electrode element.

9. The nonaqueous electrolyte battery according to claim 6, wherein concentration of $LiMF_m$ is approximately 20% by weight with respect to said nonaqueous electrolyte.

* * * * *